H. E. VAN NESS.
COASTING SPROCKET.
APPLICATION FILED JAN. 21, 1918.
1,270,570.
Patented June 25, 1918.
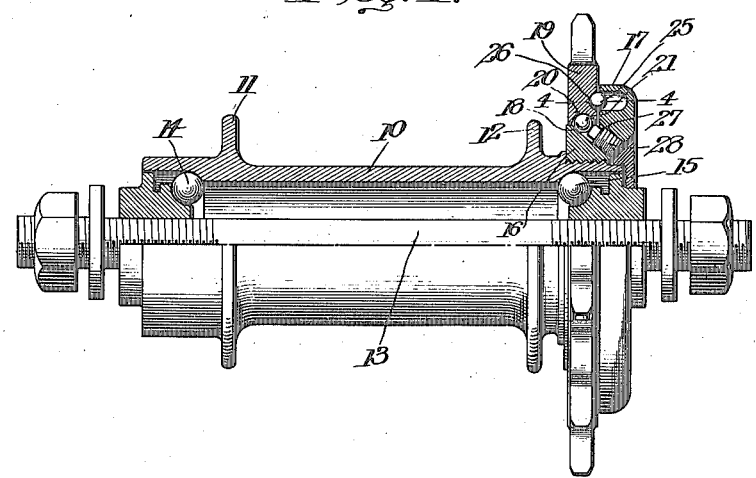
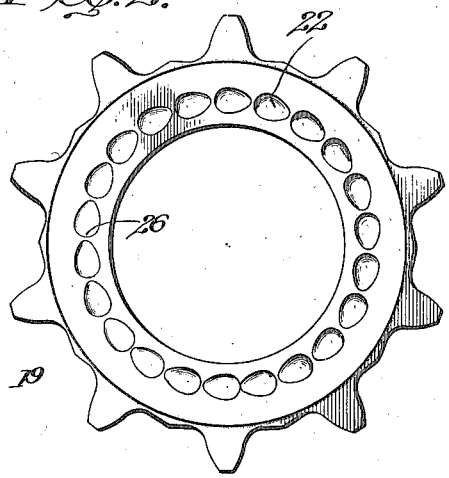
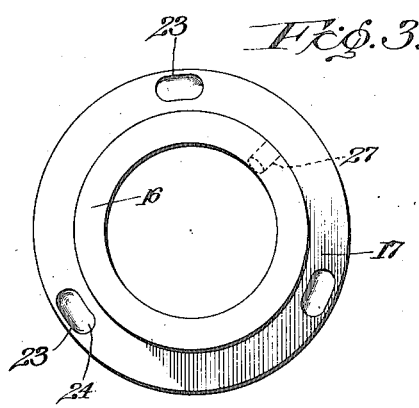
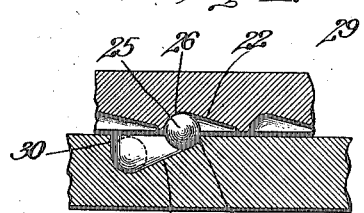
Inventor
Henry E. Van Ness
By Foster Freeman Watson & Coit
Attorney

UNITED STATES PATENT OFFICE.

HENRY E. VAN NESS, OF ELMIRA, NEW YORK.

COASTING-SPROCKET.

1,270,570.

Specification of Letters Patent. Patented June 25, 1918.

Application filed January 21, 1918. Serial No. 212,969.

*To all whom it may concern:*

Be it known that I, HENRY E. VAN NESS, a citizen of the United States, and residing at Elmira, Chemung county, State of New York, have invented certain new and useful Improvements in Coasting-Sprockets, of which the following is a specification.

This invention relates to coasting sprockets and more particularly to a structure of this type for use in bicycles adapted to connect a driving sprocket to the hub of the driving wheel when the sprocket is rotated in the direction to propel the bicycle, but permitting the wheel to coast or be trundled along without transmitting rotation to the sprocket.

The principal objects of the invention are to provide a roller clutch in which the usual wedging action between the clutch members and crushing strain on the roller are very nearly eliminated and to provide an arrangement of parts whereby the annular driving member may be mounted on a simple roller bearing substantially in the plane of rotation of said member. Other objects and features of novelty will be apparent from the description taken in connection with the drawings in which:

Figure 1 is an elevation, half being in section illustrating the invention as embodied in connection with the hub of the driving wheel of a bicycle;

Fig. 2 is a side elevation of the driving sprocket illustrating the ball recesses formed in one side of the same;

Fig. 3 is a side elevation of the collar adapted to be mounted on the hub and illustrating the ball recesses formed in one side of the same;

Fig. 4 is a section taken substantially on the line 4—4 of Fig. 1.

Referring to the drawings the reference character 10 indicates the hub of the driving wheel of a bicycle provided with the usual spoke flanges 11 and 12 and rotatively mounted on the axle 13 by means of the usual ball bearings 14 and 15. At one end of the hub is a collar 16 which may be secured thereto in any suitable manner, as shown, being threaded thereon. This collar 16 is formed with the radially projecting flange portion 17 and with a ball race 18. An annular sprocket or ring 19 has a ball race 20 formed at its inner periphery and is adapted to be rotatively mounted on the collar 16 by means of the balls 21 in the said races 18 and 20. One side of the sprocket which is arranged adjacent a side of the flange 17 is formed with the angle recesses 22. The adjacent side of the flange 17 is formed with angle recesses 23. As shown in Fig. 4 the angle recess 23 has its shallow end formed to afford a seat 24 for the ball 25 so that the ball will be held with substantially a half thereof projecting from the side of the flange. The other end of the recess 23 is formed of sufficient depth so that the ball 25 may be entirely retracted within the recess, no portion of the ball projecting therefrom.

The recesses 22 in the sprocket are smaller than the recesses 23 and are substantially semi-ovoid in form, and as clearly shown in Fig. 4 the deep end of the recess 22 is formed with a seat 26 similar to the seat 24 which is adapted to fit the ball 25 and hold the same with a half within the recess and a half projecting at the side of the sprocket. Preferably the number of recesses formed in the sprocket and the number formed in the flange are prime to each other. Thus the sprocket is shown as formed with 22 recesses and the flange with three. Consequently if the clutch is disengaged the two members will have a relative movement of less than the angle between the two adjacent recesses in the sprocket to clutch the members together. Thus the clutch is quick acting, and as the movement of the driving member in clutching direction is very slight, the driving parts do not attain any appreciable momentum when the clutch is applied. As a result of this construction and arrangement of parts therefore the balls are not subjected to the hammer blows that would obtain if there were considerable relative movement between the parts when applying the clutch.

From an examination of Fig. 4 it will be seen, when the balls are in clutching position, substantially one-fourth of the surface of each ball bears on the seat 26 and another one-fourth on the seat 24 of the other clutch member. Thus a positive lock or clutching action is secured but with substantially no wedging action or side thrust on the clutching members. Furthermore, because of this construction neither the balls nor the edges of the recesses are deformed or injured, as is the case where a line or point contact only is obtained between the ball and clutch members.

Although the race ways 18 and 20 are shown as formed in the collar and sprocket respectively, it is to be understood that the invention is not limited to having these race ways integral with the parts as they might be provided in other ways. For the purpose of inserting the balls 21 the collar 16 may be provided with the aperture 27. After the balls are inserted the aperture may be closed by a plug 28.

In the operation of the device when the sprocket is rotated in the direction to propel the bicycle, one of the balls 25 will register with a recess 22 and move to the seat 26 therein. Thus rotation will be transmitted from the sprocket through the ball which is now in contact with the seat 24 of the collar to the collar and the hub. If it is desired to coast, the collar overruns the sprocket and the edge 30 of the recess 23 strikes the ball moving it along the recess 22 in the sprocket so that the ball is thus forced out of the latter recess into the deep portion of the recess 23 to the position shown in dotted lines, Fig. 4.

Although an embodiment of the invention having a ball clutch has been described, it is to be understood that the invention is not limited to a clutch employing a ball but that other forms of rollers may be used. Furthermore, the details of the structure illustrated may be varied within the scope of the appended claims without departing from the spirit of the invention.

Having thus described the invention what is claimed as new and desired to be secured by Letters Patent is:

1. A coaster sprocket for bicycles including in combination, a rotatable hub having a radial flange, an annular sprocket rotatably mounted on the hub having a side thereof juxtaposed and facing a side of said flange, a roller bearing between the hub and sprocket arranged substantially in the plane of the sprocket, said sides each formed with a recess, the recess in the flange having a deep end and a shallow end, the shallow end being formed to fit and seat a ball with half projecting and the deep end having a depth for the total retraction of the ball, a ball in said flange recess, the recess in the sprocket being substantially semi-ovoid, the deep end adapted to fit and form a seat for the ball with half projecting from the side thereof.

2. A device of the class described including in combination, a driving ring, a driven member, a ball bearing between the inner periphery of said ring and said member, a flange on said member having one side arranged close to a side of the ring, each of said sides having an angle recess, a ball in the angle recess of the flange, said recess being deep enough to house the ball, the shallow end of said flange recess and the deep end of said driving ring recess being shaped to fit the ball when in driving position with a half of the ball in each recess.

3. A device of the class described including in combination a rotatable member, an annular wheel, a bearing between said wheel and member substantially in the plane of the wheel, and a ball clutch for connecting said wheel and member for one direction of rotation of said wheel comprising a ball, an angle recess formed in the wheel and an angle recess in the member, the deep end of one recess and the shallow end of the other shaped to form seats fitting the ball whereby when the parts are in clutched position the ball bears equally on the two said seats without any substantial wedging.

4. A device of the class described including in combination, a rotatable driven member, a rotatable driving member, adjacent portions of said members being formed, the one with an angle recess and the other with a recess one end of which is shallower than the other, a ball in said latter recess, the said shallow end being formed with a seat fitting substantially one-quarter of the surface of the ball, the deep end of the angle recess being formed with a similar seat whereby the ball when resting on both seats connects the members for rotation without any substantial wedging action.

5. A ball clutch including in combination, a rotatable driving member, a driven member mounted for rotation about the same axis and having a flange at the side of the driving member, both of said members being held against axial displacement, adjacent sides of said members each formed with an angle recess, a ball in one of said recesses the shallow end being formed with a seat for the ball fitting substantially one quarter of the surface thereof and the deep end of the other recess having a similar seat whereby the ball when resting on both seats connects the members for rotation without any substantial end thrust.

6. A device of the class described including in combination, a rotatable driven member, a rotatable driving member, adjacent portions of said members being formed, the one with an angle recess and the other with a recess one end of which is shallower than the other, a roller in said latter recess, the said shallow end being formed with a seat fitting substantially one-quarter of the peripheral surface of the roller, the deep end of the angle recess being formed with a similar seat whereby the roller when resting on both seats connects the members for rotation without any substantial wedging action.

In testimony whereof I affix my signature.

HENRY E. VAN NESS.